United States Patent [19]

Spanke

[11] 4,181,351
[45] Jan. 1, 1980

[54] FLAT BED CONVERSION KIT FOR PICKUP TRUCKS

[75] Inventor: Theodore J. Spanke, Bakersfield, Calif.

[73] Assignee: Add-a-Bed Corporation, Bakersfield, Calif.

[21] Appl. No.: 859,385

[22] Filed: Dec. 12, 1977

[51] Int. Cl.² ............................................. B60J 7/10
[52] U.S. Cl. ................................. 296/100; 296/137 R
[58] Field of Search .............. 296/3, 10, 36, 43, 35 A, 296/100, 137 R; 280/80 B

[56] References Cited

U.S. PATENT DOCUMENTS

| | | | |
|---|---|---|---|
| 2,478,578 | 8/1949 | Gottshall | 296/35 A |
| 2,591,380 | 4/1952 | Schreiner | 296/10 X |
| 2,729,501 | 1/1956 | Van Doore | 296/66 |
| 3,012,814 | 12/1961 | Penner | 296/100 |
| 3,475,046 | 10/1969 | Webster | 296/3 |
| 3,512,828 | 5/1970 | Craft | 296/100 |
| 3,514,152 | 5/1970 | Hermon | 296/100 |
| 3,765,713 | 10/1973 | Suitt | 296/3 |
| 3,866,972 | 2/1975 | Reese | 296/100 |
| 3,954,296 | 5/1976 | Patnode | 296/10 |

Primary Examiner—Joseph F. Peters, Jr.
Assistant Examiner—Michael Mar
Attorney, Agent, or Firm—Edgar W. Averill, Jr.

[57] ABSTRACT

A hinged, removable, flat-bed conversion kit for pickup trucks. The kit has first and second support rails for attachment to the longitudinal sides of a pickup truck. Each support rail has two or more openings for attachment of a pin and eye support member, the second half of such member being located on the flat bed. When the pin and eye members aong one side rail are opened the flat-bed may hinge upwardly and when all support members are disengaged the bed may be lifted off of the pickup truck.

9 Claims, 9 Drawing Figures

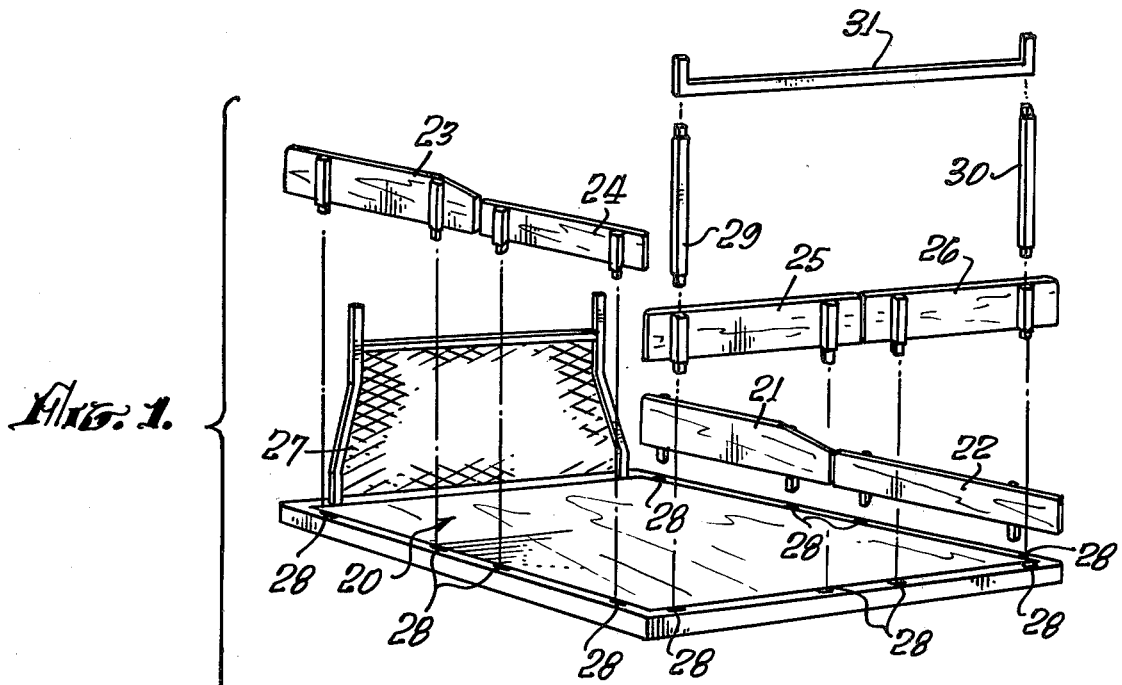
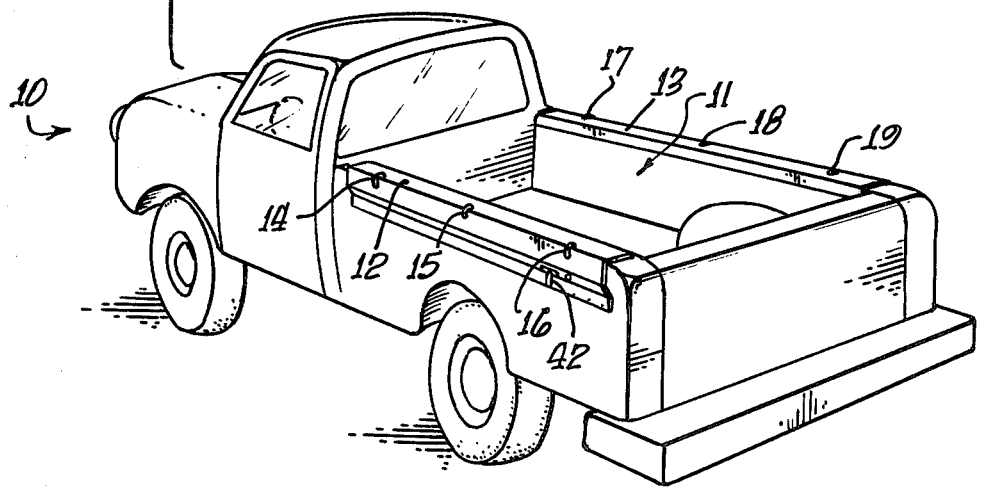
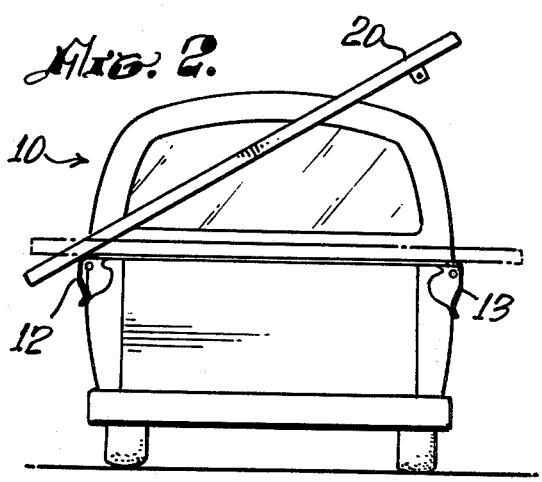
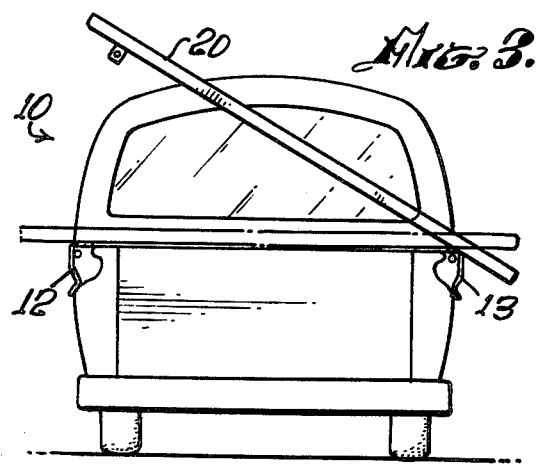

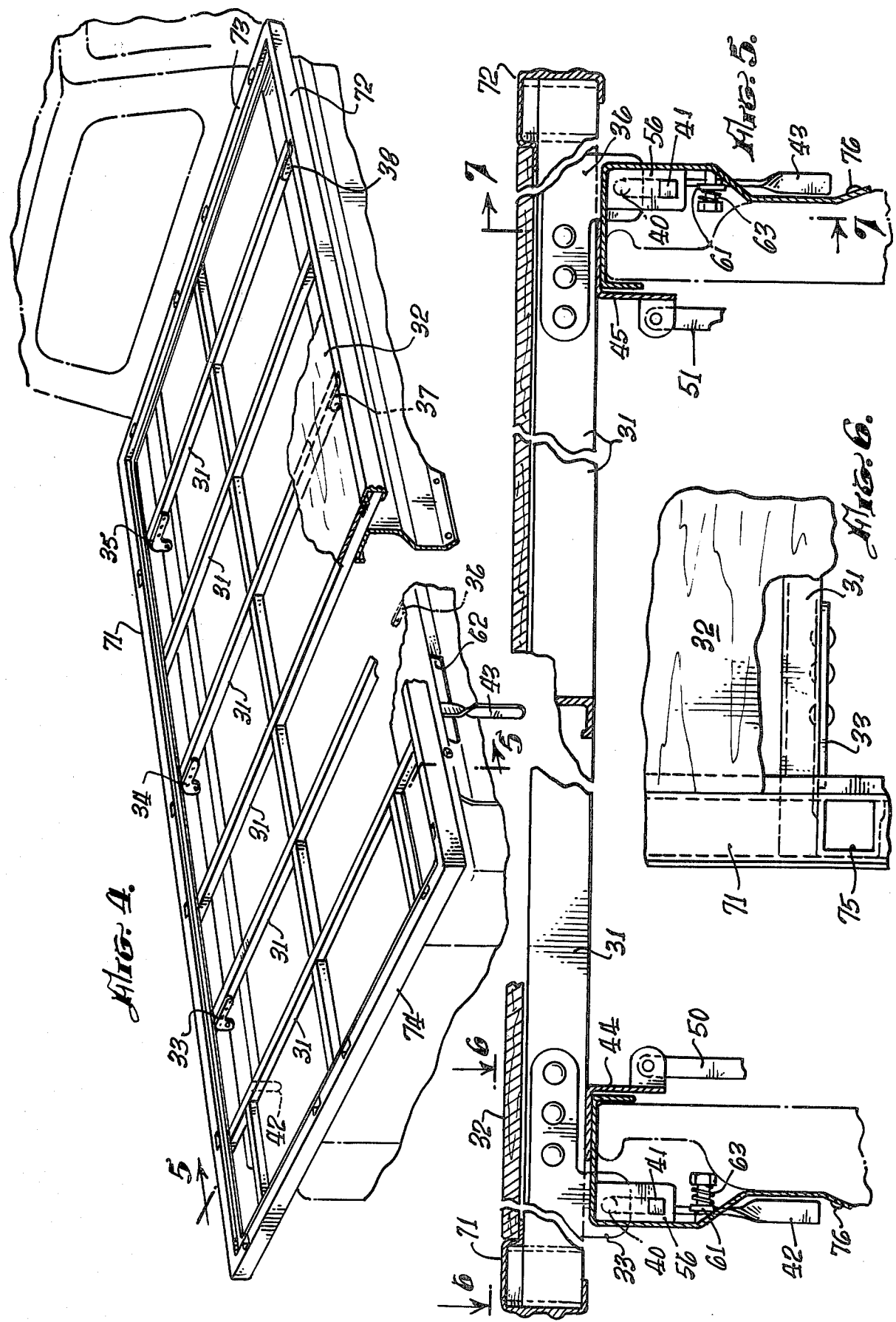

FLAT BED CONVERSION KIT FOR PICKUP TRUCKS

BACKGROUND OF THE INVENTION

The field of the invention is covers for pickup trucks and the invention more particularly relates to covers which may be used to support or carry loads.

Pickup trucks are very useful for carrying light loads but have two major drawbacks in this regard. First, the load is open to the elements and also available for potential theft. Secondly, the size of goods which may be placed in the pickup truck box is limited as compared to a flat-bed truck.

Various cover structures are disclosed in U.S. Pat. Nos. 2,729,501, 3,012,814, 3,512,828, 3,514,152, and 3,866,972. In addition a wide variety of canvas or vinyl covers are in widespread use. It is believed that none of the above devices have found widespread commercial acceptance because they do not have the combination of load carrying ability combined with the ability to be easily locked in a closed position.

SUMMARY OF THE INVENTION

It is an object of the present invention to provide a flat-bed conversion kit for converting a pickup truck into a flat-bed truck. The kit has first and second support rails affixed to the longitudinal sides of a pickup truck box. Each of the support rails has a plurality of one of a set of pin and eye supports positioned below the upper surface of the support rail. The flat-bed extends over both support rails and has mating pin and eye supports extending from the lower surface thereof and positioned to mate with the pin and eye support members of the support rails. Means are provided for moving the pin and eye support members into a disengaged position along at least one rail. The resulting flat-bed may be hingedly raised along one edge to permit the pickup box to be accessible from the top thereof. In a preferred embodiment the pin and eye support members are disengageable along both support rails so that the bed may be readily removed from the pickup truck when not needed.

BRIEF DESCRIPTION OF THE DRAWINGS

FIG. 1 is an exploded, perspective view of the flat-bed conversion kit of the present invention.

FIG. 2 is an end view of the flat-bed conversion kit open along one side.

FIG. 3 is an end view of the flat-bed conversion kit open along one side.

FIG. 4 is an enlarged, perspective view of the frame of the flat-bed of the present invention.

FIG. 5 is an enlarged, cross-sectional end view of the flat-bed of the present invention.

FIG. 6 is a view taken along line 6—6 of FIG. 5.

DESCRIPTION OF THE PREFERRED EMBODIMENTS

Figure 7:
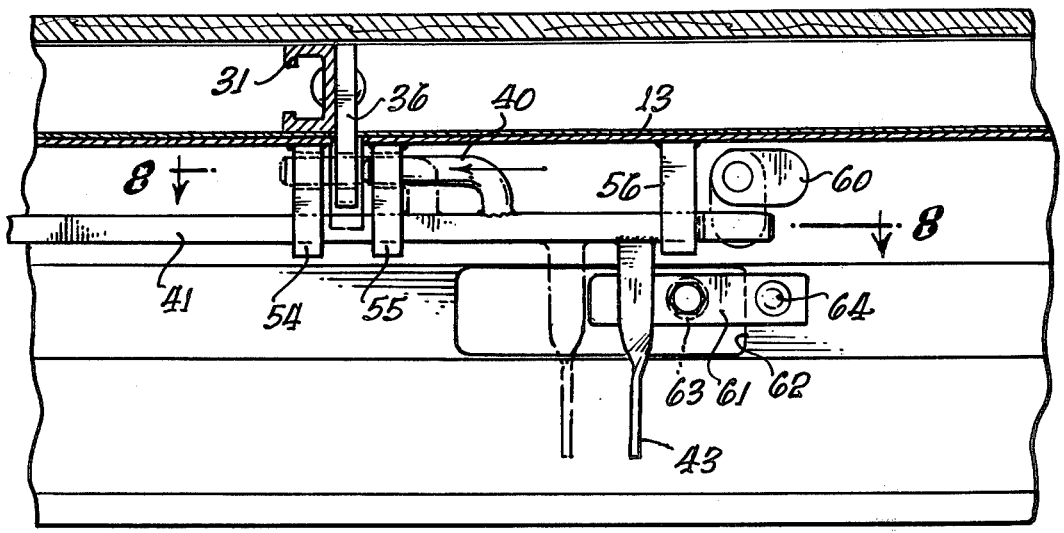
FIG. 7 is an enlarged side elevation of the pin and eye support members of the present invention taken along line 7—7 of FIG. 5.
Figure 8:
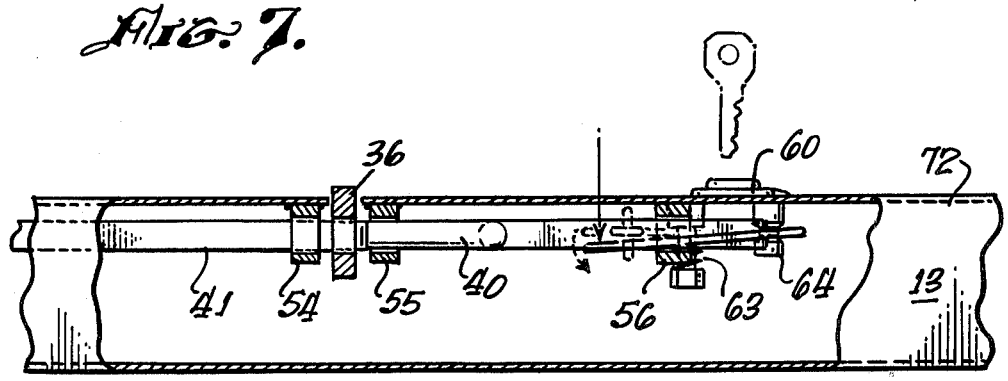
FIG. 8 is a plan view of the pin and eye support member of FIG. 7.
Figure 9:
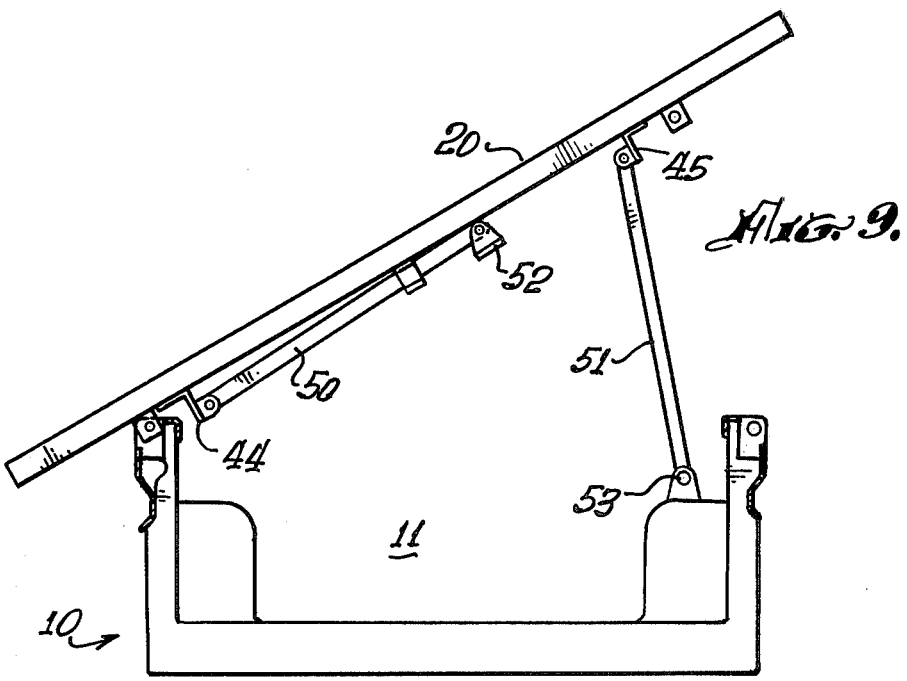
FIG. 9 is an end view of the flat-bed conversion kit of the present invention in an open position.

A pickup truck 10 is shown in perspective view in FIG. 1. The pickup truck has a conventional box 11 to which two side rails, 12 and 13 have been bolted. Each side rail has three openings, 14 through 19, under which movable pins are positioned. The flat-bed 20 is shown above the pickup truck 10 and eye members (not shown) are positioned so that they pass through slots 14 through 19 and can be engaged by the pins positioned there below. Side rails 21 through 24, end rails 25 and 26 and window guard 27 are held by stakes placed in openings 28 in the flat-bed. A pair of vertical support bars 29 and 30 hold a cross rail 31 and permit long objects to be placed over the upper bar of window guard 27 and over cross rail 31.

As shown in FIGS. 2 and 3, the flat-bed 20 may be hinged either from the left hand support rail as shown in FIG. 2, or from the right hand support rail as shown in FIG. 3. For purposes of economy it is possible that the bed could be hinged from only one side and locked for instance, with a padlock on the other side.

The details of the truck are shown in FIG. 4. A plurality of cross members 31 provides support for a plywood bed 32 shown in FIG. 5. The plywood may be either ½ inch or ⅝ inch, and, because of the many support members 31, is able to carry loads to the capacity of the pickup truck. The bed is held to the support rails by six eye members 33 through 38. Eye member 36 is shown in FIGS. 5 through 8 and cooperates with a pin 40 shown most clearly in FIG. 7. Pin 40 is welded to bar 41 which extends from opening 35 to opening 33. Handle 42 is also welded to bar 41 and a similar handle 43 is on the right rail as shown in FIG. 4. A pair of angle irons 44 and 45 are affixed to the cross members 31.

The eye members may be bolted onto the bed, through holes that have been drilled after the side rails have been affixed so that the bed may be used on trucks having different box widths. A pair of props 50 and 51 each have a hinged foot 51 and 53 which may be placed either on the wheel well or the bed of the pickup truck box to hold the flat-bed in an open position.

The combined latch and hinge action of the hook and eye support member is shown best in FIGS. 5 and 7. The eye member 36 is securely held between ears 54 and 55 which are welded to the side or support rail 12. Another ear 56 is similarly welded to rail 12. Handle 42 is welded to bar 41 and permits the longitudinal movement of pin 40 from an engaged position as shown in phantom lines to an open position.

A lock 60 is rotatable from a closed (shown in FIG. 7) to an open (shown in phantom lines in FIG. 7). A biased holding latch 61 is positioned beneath an opening 62. The latch is held toward the outside of rail 12 by spring 63 and the other end of the latch is held by pin 64. The latch may be opened by pushing the biased latch 61 inwardly and moving the handle toward the rear of the vehicle. When the handle is then moved forward it is latched in a closed position.

Because of the weight of the materials of construction, it is preferable that the side rails 71 and 72, end rails 73 and 74 and cross members 31 be fabricated from aluminum. In this way, the flat-bed can be readily lifted from one side and more easily removed from the bed.

It is evident that the bed may be readily removed by opening the pin and eye members along both sides of the bed. While the drawings show the eye positioned on the bed it is possible to reverse this positioning and place the pin on the bed and the eye below the upper surface of the rail. This change would necessitate the enlarging of the openings in the upper surface of the rail but would otherwise be equally functional.

In order to increase the usefulness of the flat bed a plurality of stake pockets 28 are formed in the side rails and end rails. Channel iron supports 75 as shown in FIG. 6 are welded below each opening. Various types of devices may be placed in the stake pockets of the type which are conventionally placed on stake-bed trucks. The side rails or support rails are shaped so that they may be bolted onto various different makes of pickup trucks. They may be affixed to the truck box by a plurality of bolts 76 as shown in FIG. 5.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

I claim:

1. A hinged, removable flat-bed conversion kit for pick-up trucks, said kit comprising:

first and second support rails affixed to the longitudinal sides of a pick-up truck box, at least one of said support rails having a plurality of one of a set of pin and eye supports affixed thereto below the upper surface of said rail;

a flat-bed extending over both support rails and having a plurality of mating pin and eye supports positioned near the outer edge of the flat-bed and extending from the lower surface of the bed and positioned to be securely engaged with and be held by the pin and eye support members of the support rails and to provide a combined latch and hinge action; and means for moving the pin and eye support members apart along at least one rail, whereby the flat-bed may be raised along one edge while hinged along the opposite edge to permit the pick-up box to be accessible from the top thereof.

2. The flat-bed conversion kit of claim 1 wherein both support rails have pin and eye supports.

3. The flat-bed conversion kit of claim 1 wherein the pins of said pin and eye supports are positioned within the support rails.

4. The flat-bed conversion kit of claim 1 further including locking means, holding the pin and eye supports in an engaged position.

5. The flat-bed conversion kit of claim 2 wherein each side rail has two pin supports positioned below a slotted opening in the upper surface of said side rail, said pin supports being longitudinally movable from an open to a closed position and said bed has two pairs of mating eye support members, whereby when the flat-bed is in position on top of the box of the pickup truck and both pin supports are closed, the flat-bed is held on top of the box, when one set of pin members is in the open position, the bed may be hinged into an open position and when both sets of pins are in the open position the bed may be removed from the truck.

6. The flat-bed conversion kit of claim 5 further including locking means on each of said support rails to hold said pin and eye supports in a closed position.

7. The flat-bed conversion kit of claim 5 wherein said means for moving the pin and eye support members comprises a longitudinal bar extending from the first slotted opening to the second slotted opening in each support member, a pin affixed to the upper side of the bar below each slotted opening and positioned so that the pin may be moved longitudinally into and out of engagement with an eye inserted through said slotted member.

8. The flat-bed conversion kit of claim 7 further including an arm affixed to said bar and extending outwardly of said support rail for moving said bar longitudinally with respect to said support rail.

9. The flat-bed conversion kit of claim 8 further including latch means engaging said arm when said pin is in engagement with the eye of the bed, whereby the pin and eye are held in a closed position.

* * * * *